US012336080B2

(12) United States Patent
Philippe et al.

(10) Patent No.: US 12,336,080 B2
(45) Date of Patent: Jun. 17, 2025

(54) INDUCTION HEATING METHOD AND APPARATUS

(71) Applicant: Edwards Limited, Burgess Hill (GB)

(72) Inventors: Laurent Marc Philippe, Gennevilliers (FR); Neil Condon, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 848 days.

(21) Appl. No.: 17/601,840

(22) PCT Filed: Apr. 7, 2020

(86) PCT No.: PCT/GB2020/050907
§ 371 (c)(1),
(2) Date: Oct. 6, 2021

(87) PCT Pub. No.: WO2020/208345
PCT Pub. Date: Oct. 15, 2020

(65) Prior Publication Data

US 2022/0210875 A1 Jun. 30, 2022

(30) Foreign Application Priority Data

Apr. 8, 2019 (GB) .................................... 1904970

(51) Int. Cl.
*H05B 6/06* (2006.01)
*H05B 6/10* (2006.01)
(Continued)

(52) U.S. Cl.
CPC ............ *H05B 6/065* (2013.01); *H05B 6/101* (2013.01); *H05B 6/362* (2013.01); *H05B 6/44* (2013.01); *H05B 2206/02* (2013.01)

(58) Field of Classification Search
CPC ...... H05B 2206/02; H05B 6/06; H05B 6/065; H05B 6/101; H05B 6/362; H05B 6/44;
(Continued)

(56) References Cited

U.S. PATENT DOCUMENTS 5,241,147 A 8/1993 Ahlen
5,477,035 A * 12/1995 Matsumoto ............. H05B 6/06 219/667

(Continued)

FOREIGN PATENT DOCUMENTS

CN 101619722 A 1/2010
CN 102984837 A 3/2013

(Continued)

OTHER PUBLICATIONS

British Examination Report dated Aug. 13, 2019 and Search Report dated Aug. 12, 2019 for corresponding British Application No. GB1904970.9, 8 pages.

(Continued)

*Primary Examiner* — Quang T Van
(74) *Attorney, Agent, or Firm* — Theodore M. Magee; Westman, Champlin & Koeher, P.A.

(57) ABSTRACT

Aspects of the present invention relate to an induction heating system for heating a component. The induction heating system includes a power module for outputting an alternating current, the power module being operable to output the alternating current at a variable supply frequency. A controller is provided to identify at least one resonant frequency of the alternating current supplied to the at least one induction element. The controller is configured to determine an operating temperature of the component in dependence on the at least one identified resonant frequency. Aspects of the present also relate to an induction heating controller; a component having an induction heating element; and to a method of heating a component by inductive heating.

5 Claims, 8 Drawing Sheets

(51) Int. Cl.
*H05B 6/36* (2006.01)
*H05B 6/44* (2006.01)

(58) Field of Classification Search
CPC ... C04B 18/082; C04B 18/142; C04B 18/146; C04B 2201/50; C04B 28/04; C04B 28/08; Y02E 60/10; Y02W 30/91
USPC ....... 219/635, 660, 662, 672, 690, 695, 696, 219/697, 698; 331/101, 160, 767
See application file for complete search history.

(56) References Cited

U.S. PATENT DOCUMENTS

| | | | | |
|---|---|---|---|---|
| 2011/0120989 | A1 | 5/2011 | Schilling et al. | |
| 2014/0008355 | A1 | 1/2014 | Chaffey et al. | |
| 2014/0361007 | A1 | 12/2014 | Halada et al. | |
| 2015/0060439 | A1 | 3/2015 | Pankratz et al. | |
| 2015/0226351 | A1* | 8/2015 | Bolz ..................... | F16K 49/002 219/660 |
| 2016/0169751 | A1 | 6/2016 | Zenzen | |
| 2017/0303345 | A1 | 10/2017 | Gelber et al. | |
| 2018/0148886 | A1 | 5/2018 | Kalze et al. | |
| 2018/0332998 | A1 | 11/2018 | Schmidt | |

FOREIGN PATENT DOCUMENTS

| | | | |
|---|---|---|---|
| CN | 103108422 | A | 5/2013 |
| CN | 103109165 | A | 5/2013 |
| CN | 104471821 | A | 3/2015 |
| CN | 104584685 | A | 4/2015 |
| CN | 105027386 | A | 11/2015 |
| CN | 105050851 | A | 11/2015 |
| DE | 102004033115 | A1 | 2/2006 |
| EP | 1641321 | A1 | 3/2006 |
| JP | H11121154 | A | 4/1999 |
| TW | 200942086 | A | 10/2009 |
| WO | 0013467 | A1 | 3/2000 |
| WO | 2018178113 | A2 | 10/2018 |

OTHER PUBLICATIONS

PCT Notification of Transmittal of the International Search Report and the Written Opinion of the International Searching Authority, or the Declaration dated Sep. 3, 2020 and PCT Search Report dated Sep. 3, 2020 for corresponding PCT Application No. PCT/GB2020/050907.

PCT Written Opinion dated Sep. 3, 2020 for corresponding PCT Application No. PCT/GB2020/050907.

First Office Action, including Search Report, for Chinese Patent Application No. 202080027100.7, dated Oct. 25, 2023, 15 pages.

Office Action, including Search Report, for Taiwanese Patent Application No. 109111828, dated Dec. 25, 2023, 20 pages.

Lervik, J. et al., "Optimizing electrical Heating System of Subsea Oil Production Pipelines," SINTEF Energy Research, Trondheim, Norway. Proceedings of 28th (2018) International Ocean and Polar Engineering Conference, ISOPE 2018, ISBN 978-1-880653-87-6.

* cited by examiner

INDUCTION HEATING METHOD AND APPARATUS

CROSS-REFERENCE OF RELATED APPLICATION

This application is a Section 371 National Stage Application of International Application No. PCT/GB2020/050907, filed Apr. 7, 2020, and published as WO 2020/208345 A1 on Oct. 15, 2020, the content of which is hereby incorporated by reference in its entirety and which claims priority of British Application No. 1904970.9, filed Apr. 8, 2019.

FIELD

The present disclosure relates to an induction heating method and apparatus. Aspects of the invention relate to an induction heating system; an induction heating controller; a component comprising an induction heating element; and a method of heating a component by inductive heating.

BACKGROUND

It is known to utilise a temperature management systems (TMS) for heating pipelines, flanges, valves and other components in an industrial process, for example in a vacuum system. Known TMS traditionally uses a resistive heater, which is strapped onto a conduit or other components to raise their temperature. The transfer of heat is primarily through conduction from the resistive heater into the conduit or component. This type of TMS is ubiquitous in semiconductor vacuum processing, and other process industries. The heat is used to help reduce or avoid condensation or to help sublimation of material in areas of the system which are costly or disruptive to service. However, known TMS and resistive heaters have certain limitations. For example, they may result in non-uniformity of the temperature, resulting in cold-spots that eventually determine the mean-time between service (MTBS). Other important factors are overall temperature (there is a trend towards higher temperatures, greater than 150° C., for new processes) and thermal efficiency, which drives cost of ownership. Other important factors include cost, reliability, ease of diagnosing problems/failures of heaters, and simplicity of installation.

It is an aim of the present invention to address one or more of the disadvantages associated with the prior art.

The discussion above is merely provided for general background information and is not intended to be used as an aid in determining the scope of the claimed subject matter. The claimed subject matter is not limited to implementations that solve any or all disadvantages noted in the background.

SUMMARY

Aspects and embodiments of the invention provide an induction heating system; an induction heating controller; a component; and a method as claimed in the appended claims According to an aspect of the present invention there is provided an induction heating system for heating a component, the induction heating system comprising:

at least one induction element for positioning proximal to an exterior of the component;

at least one power module for outputting an alternating current to the at least one induction element; and a controller configured to identify at least one resonant frequency of the alternating current supplied to the at least one induction element;

wherein the controller is configured to determine an operating temperature of the component in dependence on the at least one identified resonant frequency. In use, the alternating current supplied to the at least one induction element generates an alternating magnetic field for generating an electrical current inside the component to perform heating. The controller may determine the temperature of the component by monitoring the current supplied to the at least one induction element. At least in certain embodiments, the operating temperature of the component can be monitored without the need for a separate temperature sensor.

The controller is configured to control a supply frequency of the alternating current which is output to the at least one induction element. The controller may be configured to control operation of the at least one power module, for example to control the frequency of the alternating current output to the at least one induction element. The induction heating system according to the present invention generates alternating electromagnetic fields to generate heat directly in the component.

At least in certain embodiments the induction heating of the component may provide improved efficiency since less electrical power is required to generate a certain amount of heat, particularly at higher temperatures/heat input rates. It is believed that certain embodiments of the induction heating system may provide improved reliability since the induction element may be less prone to damage, for example during maintenance. The induction heating system may provide improved uniformity of heating, for example where several zones or regions are heated from a common controller. It is envisaged that the induction heating system may be capable of generating high temperatures, for example greater than or equal to 200° C. Since the induction element does not have to contact the component, at least in certain embodiments it may be simpler to achieve uniform heating/temperatures, for example if the component has a complex geometry. The heating of the component is relatively insensitive to the size of a gap between the or each induction element and the component. It may also be possible to eliminate the need for separate temperature monitoring means, such as a sensor or sensors, which may add to the cost and complexity, notably during installation The controller may be configured to identify at least one resonant frequency of the alternating current supplied to the at least one induction element. By identifying the at least one resonant frequency, the controller can selectively control the transmittal of power to perform heating of the component.

The controller may be configured to control the power module to change the supply frequency of the alternating current. The controller may measure a current across the at least one induction element as a function of the supply frequency. The controller may control the power module to implement substantially continuous or incremental (stepped) changes in supply frequency.

The controller may be configured to monitor changes in the measured current in dependence on changes in the supply frequency of the alternating current. The controller may be configured to identify at least one peak in the measured current. The or each peak may comprise an increase or a spike in the measured current. The or each peak may be associated with a discrete subset or region of the supply frequency. The controller may identify the at least one resonant frequency corresponding to the or each peak in the measured current. The identification of the at least one resonant frequency may comprise identifying the one or more supply frequency of the alternating current corresponding to the or each peak in the measured current. Each supply frequency resulting in a peak in the measured current may be indicative of a resonant inductive coupling. The or each resonant inductive coupling is established between the or each induction element and the component. The resonance results in a reduction of the phase shift between the current and the applied voltage leading to a reduction of the circuit impedance which leads to an increase in the current across the at least one induction element. The power transfer to the component is increased at the resonant frequency.

The controller may be configured to identify the one or more supply frequency of the power module corresponding to the or each peak detected in the measured current. Each peak may correspond to a separate resonant frequency, for example if more than one induction element is connected in parallel. The controller may be configured to identify a plurality of peaks in the measured current. Each peak may be indicative of a resonant frequency in a separate induction element.

The controller may be configured to determine a phase difference between the voltage applied to the at least one induction element and the current in the at least one induction element. The at least one resonant frequency may be identified in dependence on the determined phase difference. The controller may be configured to control the power module to change the supply frequency of the alternating current and to determine the phase difference. The identification of the at least one resonant frequency may comprise identifying one or more supply frequencies which results in the phase difference being at least substantially zero.

The induction heating system may comprise a plurality of induction elements. The controller may be configured to identify a plurality of resonant frequencies of the alternating current supplied to the induction elements. The controller may identify a discrete resonant frequency for each induction element.

The controller is configured to determine an operating temperature of the component in dependence on the identified resonant frequencies. The controller may be configured to determine the operating temperature of a section or region of the component associated with a particular one of the induction elements. At least in certain embodiments, the controller may determine a localised operating temperature of a part of the component. For example, the controller may determine a localised operating temperature of a section or a region of the component in dependence on the identified resonant frequency of the induction element associated with that section or region.

According to a further aspect of the present invention there is provided an induction heating system for heating a component, the induction heating system comprising:

a plurality of induction elements for positioning proximal to an exterior of the component;

at least one power module for outputting an alternating current to the induction elements; and a controller configured to identify a plurality of resonant frequencies of the alternating current supplied to the at least one induction element. The controller may identify a discrete resonant frequency for each induction element. The controller may be configured to control operation of the at least one power module, for example to control the frequency of the alternating current output to the induction elements.

The alternating current output to the inductions elements generates an alternating magnetic field for generating an electrical current inside the component to perform heating. The controller may be configured to control the power module to control a supply frequency of the alternating current.

The controller may be configured to determine how many induction elements are connected in parallel to the power module in dependence on the plurality of identified resonant frequencies. Each identified resonant frequency may indicate a separate induction element. The controller may determine that each identified resonant frequency indicates the presence of an induction element. The controller may count the number of identified resonant frequencies and determine that the outcome of this count is the total number of induction elements. The controller may identify one or more resonant frequencies each resonant frequency corresponding to an induction element in the induction heating system.

The controller may be configured to determine an operating temperature of the component in dependence on the identified resonant frequencies. The controller may determine the operating temperature of a section or region of the component associated with a particular one of the induction elements. At least in certain embodiments, the controller may determine a localised operating temperature of a part of the component. For example, the controller may determine a localised operating temperature of a section or a region of the component in dependence on the identified resonant frequency of the induction element associated with that section or region.

The controller may be configured to control the power module to change the supply frequency of the alternating current. The controller may measure a current across the at least one induction element as a function of the supply frequency. The controller may control the power module to implement substantially continuous or incremental (stepped) changes in supply frequency.

The controller may be configured to monitor changes in the measured current in dependence on changes in the supply frequency of the alternating current. The controller may be configured to identify a plurality of peaks in the measured current. The or each peak may comprise an increase or a spike in the measured current. The or each peak may be associated with a discrete subset or region of the supply frequency. The controller may identify the resonant frequencies corresponding to each peak in the measured current. The identification of the plurality of resonant frequencies may comprise identifying the supply frequencies of the alternating current corresponding to the peaks in the measured current. Each supply frequency resulting in a peak in the measured current may be indicative of a resonant inductive coupling. The resonant inductive couplings may be established between the induction elements and the component. The resonance results in a reduction of the phase shift between the current and the applied voltage leading to a reduction of the circuit impedance which leads to an increase in the current across the at least one induction element. The power transfer to the component is increased at the resonant frequency.

The controller may be configured to identify the supply frequencies of the power module corresponding to each peak detected in the measured current. Each peak may correspond to a separate resonant frequency, for example if more than one induction element is connected in parallel. The controller may be configured to identify a plurality of peaks in the measured current. Each peak may be indicative of a resonant frequency in a separate induction element.

The controller may be configured to control the power module to reduce a frequency offset between the supply frequency and the identified resonant frequency to increase or maintain heating of the component; and/or to increase a frequency offset between the supply frequency and the identified resonant frequency to reduce heating of the component. This control strategy may be performed in respect of each identified resonant frequency. If the controller identifies a plurality of resonant frequencies, the frequency offset between the supply frequency and the identified resonant frequency may be controlled in respect of each identified resonant frequency. This control strategy may enable thermal control of each of a plurality of induction elements.

The controller may be configured to control the power module selectively to control the supply frequency of the alternating current output to the at least one induction element to maintain the component at a target temperature.

Alternatively, or in addition, the controller may be configured to control the power module selectively to control the voltage supplied to the at least one induction element to maintain the component at a target temperature. The supply voltage may be selectively switched ON and OFF to control the temperature of the component.

The controller may be configured to determine an operating temperature of the component in dependence on the identified resonant frequency. Alternatively, or in addition, the controller may have an input for receiving a temperature signal from a temperature sensor, such as a thermocouple.

The induction heating system may comprise a plurality of the induction elements. The induction elements may be connected to the power module in parallel or in series.

Each induction element may have a capacitor(s) associated therewith. The capacitor(s) associated with each induction element may have a different capacitance. The capacitor (s) associated with each induction element may have a unique capacitance. By way of example, a first capacitor associated with a first induction element may have a different capacitance to a second capacitor associated with a second induction element. At least in certain embodiments, the different capacitance of the capacitors associated with the induction elements may result in a different resonant frequency for each induction element. A controller may thereby identify the presence or absence of each induction element.

The capacitor(s) may be provided in the induction element. Alternatively, or in addition, the capacitor(s) may be provided in the power module.

According to a further aspect of the present invention there is provided an induction heating system for heating a component, the induction heating system comprising:

- a power module for outputting an alternating current to a first induction element and a second induction element, the first induction element and the second induction element being connected in parallel;
- a first capacitor being associated with the first induction element and a second capacitor being associated with the second induction element, the first and second capacitors having different capacitances. At least in certain embodiments, the different capacitance of the first and second capacitors may result in a different resonant frequency for the first and second induction elements. The induction heating system may comprise a controller configured to identify the presence or absence of each of the first and second induction elements in dependence on the identification of the resonant frequencies. It will be understood that the induction heating system may comprise one or more additional induction elements, each having a capacitor associated therewith. The capacitors in the induction heating may each have different capacitance.

The first and second capacitors may be provided in the power module. Alternatively, the first and second capacitors may be provided in the first and second induction elements respectively.

The induction heating system may comprise a controller. The controller may be configured to identify first and second resonant frequencies of the alternating current supplied to the first and second induction elements. The controller may be configured to identify the presence and absence of the first and second induction elements in dependence on the identification of the first and second resonant frequencies.

The induction heating system may comprise a plurality of the power modules. Each power module may be configured to supply the alternating current to one or more of a plurality of induction elements.

The power modules may be connected to each other in a daisy-chain arrangement. The power modules may be connected to each other in series. The power modules may be connected to a common power source, for example a mains power source. The mains power source may be a universal voltage, for example in the range 100V to 460V.

The controller may be configured to control the power modules independently of each other. A control signal may be transmitted from the controller between the power modules, for example along the connection forming the daisy-chain arrangement.

Each induction element may comprise or consist of an inductive coil.

The component is electrically conductive. The component may, for example, be composed of a metal or a metal alloy. The component may comprise or consist of a conduit.

According to a further aspect of the present invention there is provided an induction heating controller for controlling a variable frequency alternating current (AC) power module configured to supply an alternating current to at least one induction element, the controller comprising at least one processor and a memory device, the at least one processor being configured to:

- change a supply frequency of the alternating current; and
- monitor a current in the at least one induction element as the supply frequency of the alternating current changes;
- identify at least one resonant frequency of the alternating current supplied to the at least one induction element by the power module; and
- determine an operating temperature of the component in dependence on the at least one identified resonant frequency.

The at least one processor may be configured to identify the at least one resonant frequency by identifying at least one peak in the measured current indicative of at least one resonant inductive coupling.

The at least one processor may be configured to determine a phase difference between the voltage applied to the at least one induction element and the current in the at least one induction element. The at least one resonant frequency may be identified in dependence on the determined phase difference. The at least one processor may be configured to control the power module to change the supply frequency of the alternating current and to determine the phase difference. The identification of the at least one resonant frequency may comprise identifying the supply frequency which results in the phase difference being at least substantially zero.

According to a further aspect of the present invention there is provided a power module for outputting an alternating current to a first induction element and a second induction element, the power module comprising:

a first output for connection to the first induction element; and a second output for connection to the second induction element;

the first and second outputs being configured to connect the first and second induction elements in parallel with each other;

wherein a first capacitor is associated with the first output and a second capacitor is associated with the second output, the first and second capacitors having different capacitances. The different capacitances of the first and second capacitors may result in a different resonant frequency of the first and second induction elements. When connected to the first induction element, the first capacitor may be arranged in series with the first induction element. When connected to the second induction element, the second capacitor may be arranged in series with the second induction element. A controller may be provided to detect the presence and absence of each of the first and second induction elements in dependence on the identification of different resonant frequencies.

According to a still further aspect of the present invention there is provided a component comprising at least one integrated induction element for connection to an alternating current (AC) power module to generate an alternating magnetic field for generating electrical currents inside the component to perform heating. The induction element may comprise or consist of an inductive coil. An electrical insulator may be provided between the component and the inductive coil. For example, an electrically insulating sheet or panel may be provided between the component and the inductive coil. The sheet or panel may optionally also have thermal insulating properties to reduce heat loss from the component. The induction element may be formed as a separate component and then fastened to the component. The component may have a unitary construction. The at least one induction element may be permanently attached.

According to a further aspect of the present invention there is provided an induction heating device comprising an induction element for connection to an alternating current (AC) power module to generate an alternating magnetic field for generating electrical currents inside an electrically conductive component to perform heating, the induction element having a longitudinal alternating configuration. The induction element may comprise or consist of an inductive coil. The inductive coil may comprise a longitudinally alternating configuration. The inductive coil may be disposed in a single plane. In use, the substrate may be configured to be positioned proximal to or in contact with the component.

The induction heating device may comprise means for electrically insulating the inductive coil. The induction element may be disposed on an electrically insulating member for positioning against the component. The electrically insulating member may be deformable to facilitate positioning of the induction element proximal to or in contact with the component.

According to a further aspect of the present invention there is provided an induction heating device comprising an induction element for connection to an alternating current (AC) power module to generate an alternating magnetic field for generating electrical currents inside an electrically conductive component to perform heating.

The induction heating device may be configured to be connected to another like induction heating device. The induction heating device may comprise connectors for connecting to a like induction heating device. The induction heating device may be configured to be connected in parallel to another like induction device. The induction heating devices may be configured to be connected together in a daisy-chain configuration.

The induction heating device may comprise a capacitor associated with the induction element. The capacitor may be arranged in series with the induction element. The induction heating device may be identifiable within a heating induction system by identifying a resonant frequency affected by the capacitance of the capacitor. A set comprising a plurality of the induction heating devices may be supplied, the induction heating devices may each have a different capacitance. The different capacitances may result in a different resonant frequency of the induction elements in each induction heating device. A controller may be provided to detect the presence and absence of each induction heating device in dependence on the identification of different resonant frequencies.

According to an aspect of the present invention there is provided an induction heating system for heating a component, the induction heating system comprising:

a power module for outputting an alternating current, the power module being operable to output the alternating current at a variable supply frequency;

a controller for controlling the power module selectively to control a supply frequency of the alternating current; and at least one induction element for positioning proximal to an exterior of the component;

wherein the power module is configured to supply the alternating current to the at least one induction element to generate an alternating magnetic field for generating an electrical current inside the component to perform heating.

According to a still further aspect of the present invention there is provided a method of heating a component by inductive heating, the method comprising:

outputting an alternating current to at least one induction element disposed proximal to an exterior of the component;

determining at least one resonant frequency of the alternating current output to the at least one induction element; and determining an operating temperature of the component in dependence on the at least one identified resonant frequency.

The method may comprise controlling the supply frequency of the alternating current output to the at least one induction element. The at least one resonant frequency may be determined as the supply frequency changes.

The method may comprise measuring a current across the at least one induction element as a function of the supply frequency. The method may comprise monitoring changes in the measured current in dependence on changes in the supply frequency of the alternating current. Identifying the at least one resonant frequency may comprise identifying at least one peak in the measured current and identifying a corresponding resonant frequency of the alternating current output by the power module.

The method may comprise determining a phase difference between the voltage applied to the at least one induction element and the current in the induction element in dependence on changes in the supply frequency of the alternating current. The identification of the or each resonant frequency may comprise identifying when the phase difference is at least substantially zero (0).

The alternating current may be output to a plurality of induction elements. The induction elements may be connected in parallel. The method may comprise identifying a plurality of resonant frequencies of the alternating current supplied to the induction elements. The method may comprise determining how many induction elements are connected in dependence on the plurality of resonant frequencies.

The alternating current may be output to the at least one induction element to generate an alternating magnetic field for generating an electrical current inside the component to perform heating.

The method may comprise controlling the supply frequency of the alternating current. The controller may change the supply frequency of the alternating current supplied to the at least one induction element. The changes in the supply frequency may be implemented substantially continuously or incrementally.

The method may comprise monitoring changes in the measured current in dependence on changes in the supply frequency of the alternating current.

The method may comprise identifying at least one peak in the measured current. The at least one peak may represent a decrease in impedance which may indicate establishment of a resonant inductive coupling, for example between the induction element and the component. A resonant frequency of the alternating current output by the power module may be identified. The power transfer to the component is increased when the supply frequency of the alternating current is at least substantially equal to the resonant frequency.

The method may comprise identifying a plurality of peaks in the measured current. Each peak may be indicative of a resonant inductive coupling in a respective induction element.

The method may comprise determining how many induction elements are connected to the power module in parallel in dependence on the identification of the at least one peak in the measured current. The method may comprise counting the number of peaks in the measured current to determine how many resonant frequencies occur. The outcome of this count may represent the total number of induction elements. The method may comprise identifying one or more peaks (representing respective resonant frequencies) which correspond to one or more induction elements.

The method may comprise identifying the supply frequency of the power module corresponding to each peak detected in the measured current.

The method may comprise controlling the supply frequency to control the temperature of the component. A frequency offset between the instantaneous supply frequency and the identified resonant frequency. The method may comprise reducing the frequency offset to increase or maintain heating of the component. Alternatively, or in addition, the method may comprise increasing the frequency offset to reduce heating of the component.

According to a further aspect of the present invention there is provided a method of heating a component by inductive heating, the method comprising:

outputting an alternating current to at least one induction element disposed proximal to an exterior of the component;

controlling the supply frequency of the alternating current output to the at least one induction element;

determining at least one resonant frequency of the alternating current output to the at least one induction element; and determining an operating temperature of the component in dependence on the at least one identified resonant frequency.

According to a further aspect of the present invention there is provided a method of heating a component by inductive heating, the method comprising:

outputting an alternating current to at least one induction element disposed proximal to an exterior of the component;

controlling the supply frequency of the alternating current output to the at least one induction element; and determining at least one resonant frequency of the alternating current output to the at least one induction element.

The method may comprise determining a temperature of the component in dependence on the identified resonant frequency. Alternatively, or in addition, the method may comprise sending the temperature of the component using a temperature sensor.

It is to be understood that the or each controller can comprise a control unit or computational device having one or more electronic processors (e.g., a microprocessor, a microcontroller, an application specific integrated circuit (ASIC), etc.), and may comprise a single control unit or computational device, or alternatively different functions of the or each controller may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller to implement the control techniques described herein (including some or all of the functionality required for the method described herein). The set of instructions could be embedded in said one or more electronic processors of the controller; or alternatively, the set of instructions could be provided as software to be executed in the controller. A first controller or control unit may be implemented in software run on one or more processors. One or more other controllers or control units may be implemented in software run on one or more processors, optionally the same one or more processors as the first controller or control unit. Other arrangements are also useful.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

One or more embodiments of the invention will now be described, by way of example only, with reference to the accompanying drawings, in which.

DETAILED DESCRIPTION

Figure 1:
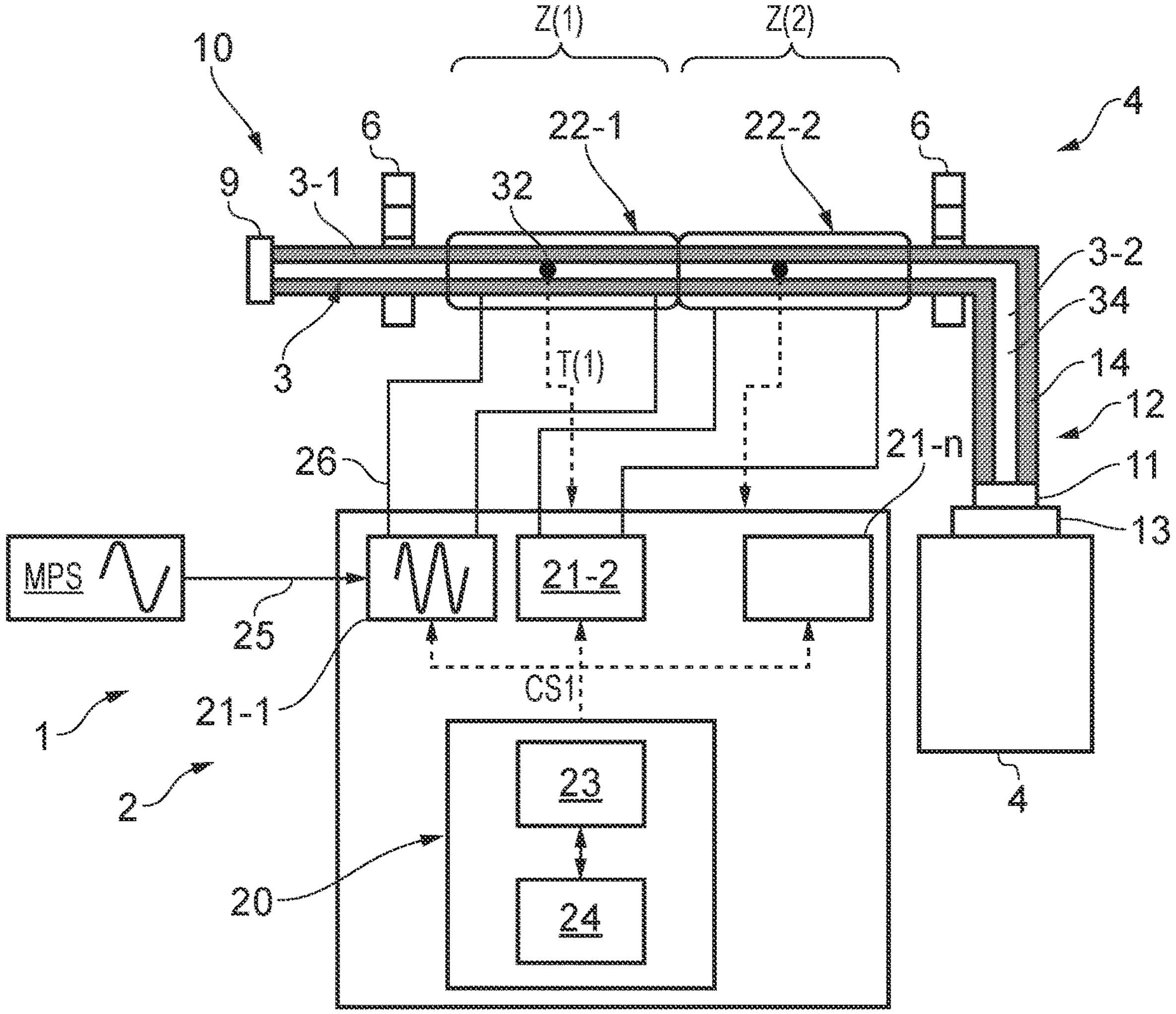
FIG. 1 shows a schematic representation of a thermal management system comprising an induction heating system in accordance with an embodiment of the present invention.

An induction heating system 1 in accordance with an embodiment of the present invention will now be described with reference to the accompanying Figures. In the present embodiment the induction heating system 1 forms part of a thermal management system (TMS) (denoted generally by the reference numeral 2). The induction heating system 1 is operative to perform inductive heating of an electrically conductive component 3. In the present embodiment, the component is in the form of a conduit 3 comprising one or more sub-sections 3-*n*.

The induction heating system 1 is operative to control the temperature of an exhaust system 4 for conveying process gases to an abatement device 5. The exhaust system 4 may, for example, be provided to transport deposition gases and associated powders expelled from a chemical vapour deposition (CVD) process. The induction heating system 1 is configured to control the temperature of the exhaust system 4 to ensure that compounds remain volatile, thereby preventing or suppressing the accumulation of solids which may partially or completely block the exhaust system 2. It will be understood that the induction heating system 1 can be used in other industrial processes.

As shown in FIG. 1, the exhaust system 4 comprises a conduit 3. The conduit 3 is in the form of a tube composed of a metal, such as stainless steel. The conduit 3 may, for example, comprise a DN40 pipe having an internal diameter of 40 mm. The conduit 3 may have a wall thickness of approximately 1 mm or 2 mm, for example. It will be understood that the conduit 3 may have larger or smaller wall thicknesses. The conduit 3 may, for example, be 10 metres or more in length and may follow a convoluted path. The conduit 3 forms a substantially continuous fluid path for conveying exhaust gases to the abatement device 4. The conduit 3 could consist of a single length of pipe. However, the conduit 3 typically comprises a plurality of subsections 3-1, 3-2 joined together in a fluid-tight manner. The conduit 3 may comprise one or more bends to provide the required connection to the abatement device 4. The conduit 3 is supported along its length by a plurality of supports 6. An inlet coupling 9 is provided at an inlet 10 of the exhaust system 4; and an outlet coupling 11 is provided at an outlet 12 of the exhaust system 4. The outlet coupling 11 is provided to connect the exhaust system 4 to the abatement device 4. The inlet and outlet couplings 9, 11 each comprise an O-ring for forming a fluid-tight seal with the associated components. A valve 13 is provided at the outlet 12 of the exhaust system 4. The valve 13 is operable to selectively open and close the outlet 12. The valve 13 may be heated to reduce the build-up of solids. A lagging 14 is provided around an exterior of the conduit 3 in order thermally to insulate the conduit 3.

The induction heating system 1 comprises a controller 20, at least one alternating current (AC) power module 21-*n* and at least one induction heating device 22-*n*. The controller 20 comprises at least one electronic processor 23 and a system memory 24. A set of computational instructions is stored in the system memory 24. When executed, the computational instructions cause the processor 23 to perform the method(s) described herein. The power module 21-*n* has an electrical input 25 connected to a mains electricity supply RMS or other electrical power source; and an electrical output 26 connected to the at least one induction heating device 22-*n*. The power module 21-*n* is configured to output a high-frequency alternating current. The power module 21-*n* may, for example, output alternating current having a frequency greater than or equal to 10 kHz. The power module 21-*n* may be a Radio Frequency (RF) power module for outputting alternating current having a supply frequency comprising an RF signal, for example having a supply frequency greater than or equal to 20 kHz. In the present embodiment, the power module 21-*n* is configured to output alternating current having a frequency greater than or equal to 100 kHz. In a variant, the power module 21-*n* may be configured to generate an alternating current having a frequency in the range 100 kHz to 1000 kHz. The power module 21-*n* in the present embodiment is a variable frequency AC power module (21-*n*). The controller 20 is connected to the power module 21-*n* (either by a wired connection or a wireless connection). The controller 20 is operative to control operation of the power module 21-*n* to control the supply frequency of the alternating current output to the at least one induction heating device 22-*n* via the output 26. As illustrated in FIG. 1, the controller 20 transmits a control signal CS1 to the power module 21-*n* to control the supply frequency. The controller 20 may optionally be configured to receive one or more signals from the power module 21-*n*. In the present embodiment, the controller 20 is configured to receive a current measurement signal from the power module 21-*n*. The power module 21-*n* may be configured to operate at a relatively low voltage (for example less than 40V) and a relatively high current (for example 10 Amps).

The at least one induction heating device 22-*n* is configured to be positioned against (i.e. in contact with), or in close proximity to the conduit 3. A plurality of the induction heating devices 22-*n* may be provided on the conduit 3. The induction heating devices 22-*n* may be disposed on the conduit 3 in a non-overlapping arrangement. The at least one induction heating device 22-*n* in the present embodiment is configured to extend at least substantially around the circumference of the conduit 3. The plurality of the induction heating devices 22-*n* may be connected to the power module 21-*n* in series or parallel. In the arrangement illustrated in FIG. 1, a plurality of the induction heating devices 22-*n* are provided on the conduit 3. The induction heating devices 22-*n* provide a plurality of temperature-controlled zones Z(n) for controlling the temperature of corresponding sections of the conduit 3. One or more induction heating devices 22-*n* may be provided in each of the temperature-controlled zones Z(n). The induction heating devices 22-*n* each have the same configuration. For the sake of brevity, the description herein is directed towards the configuration and operation of a first of the induction heating devices 22-1.

Figure 2:
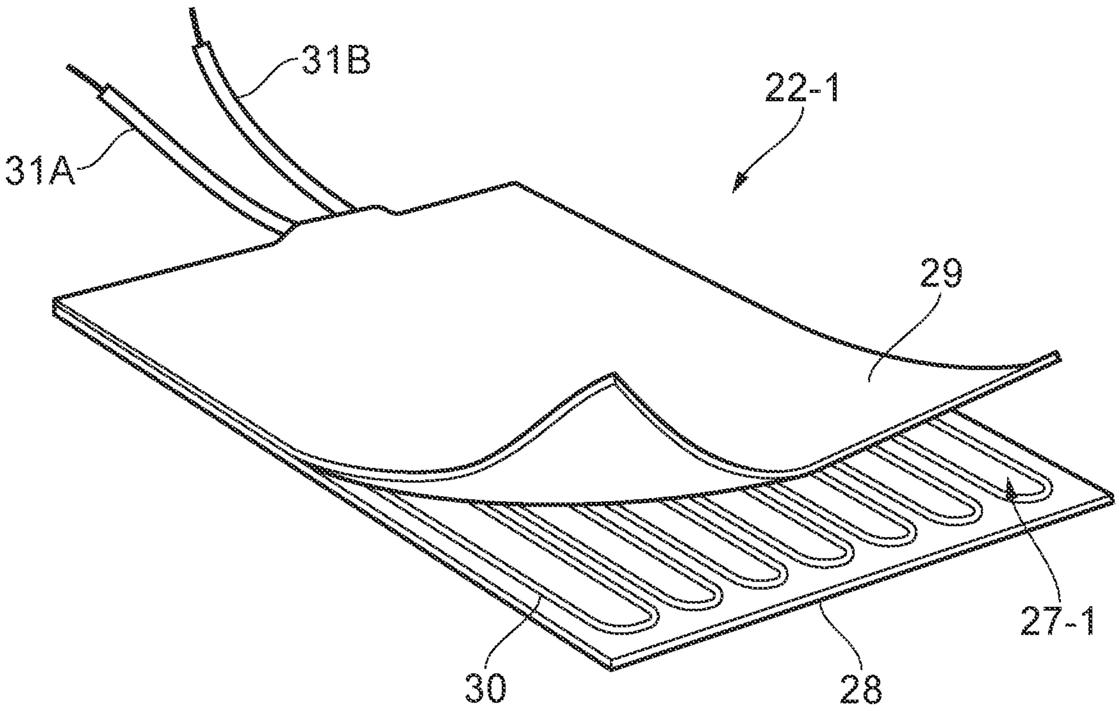
FIG. 2 shows a schematic representation of a first induction heating device for the thermal management system shown in FIG. 1.

As shown in FIG. 2, the first induction heating device 22-1 comprises an induction element 27-1, a first protective member 28 and a second protective member 29. The induction element 27-1 comprises an inductive coil 30; and first and second electrical connectors 31A, 31B for connection to the output 26 of the power module 21-*n*. The inductive coil 30 is configured to establish a concentrated magnetic field which penetrates the conduit 3. The inductive coil 30 is disposed between the first and second protective members 28, 29. In the present embodiment, the inductive coil 30 comprises an electrically conductive elongated member. The inductive coil 30 has a low resistance at a target operating frequency, or within a target operating frequency range. The inductive coil 30 may be formed from one or more wires, for example in the form of a Litz wire; or may be machined from a continuous sheet of electrically conductive material. The inductive coil 30 has a longitudinally alternating configuration, for example comprising or consisting of a sine wave-like curved configuration or a serpentine configuration. The inductive coil 30 is formed in a single plane and this arrangement is referred to herein as a "longitudinal coil". The inductive coil 30 is supported between the first and second protective members 28, 29. The inductive coil 30 may be bonded to at least one of the first and second protective members 28, 29. Alternatively, or in addition, the first and second protective members 28, 29 may be bonded to each other to form the first induction heating device 22-1. The inductive coil 30 may be disposed in a recessed track or channel formed in at least one of the first and second protective members 28, 29.

The first protective member 28 is suitable for positioning against an exterior of the conduit 3. The first and second protective members 28, 29 are electrically insulating. The first and second protective members 28, 29 may optionally be thermally insulating to reduce thermal losses from the conduit 3. The first induction heating device 22-1 is deformable to facilitate positioning against, and preferably around, an exterior of the conduit 3. The first and second protective members 28, 29 comprise flexible panels. The first and second protective members 28, 29 may, for example, be formed from rubber or an elastomeric compound. The first induction heating device 22-1 may comprise at least one fastener (not shown) for securing the first induction heating device 22-1 to the conduit 3. The at least one fastener may, for example, be provided on the second protective member 29. The at least one fastener may be releasable to facilitate positioning and/or removal of the first induction heating device 22-1. A suitable fastener may comprise a hook and loop fastener disposed on the second protective member 29. Other types of fastener may be employed to secure the first induction heating device 22-1.

The induction heating system 1 in the present embodiment comprises at least one temperature sensor 32 for outputting a temperature signal T(n) to the controller 20. The temperature sensor 32 may, for example, comprise a thermistor or the like. In the arrangement shown in FIG. 1, a plurality of temperature sensors 32 are provided on the conduit 3. The temperature sensors 32 are associated with separate temperature-controlled zones Z(n) of the induction heating system 1. The temperature sensors 32 are thermally coupled to the conduit 3. The temperature sensors 32 could, for example, be bonded to the conduit 3. In a variant, the temperature sensor 32 could be incorporated into the first induction heating device 22-1, for example in an outer surface of the first protective member 28 for positioning against the exterior of the conduit 3. Other techniques may be employed to determine the temperature of the conduit 3. As described herein, the electrical behaviour of the inductive coil 30 may be monitored to determine the temperature of the conduit 3.

Figure 3:
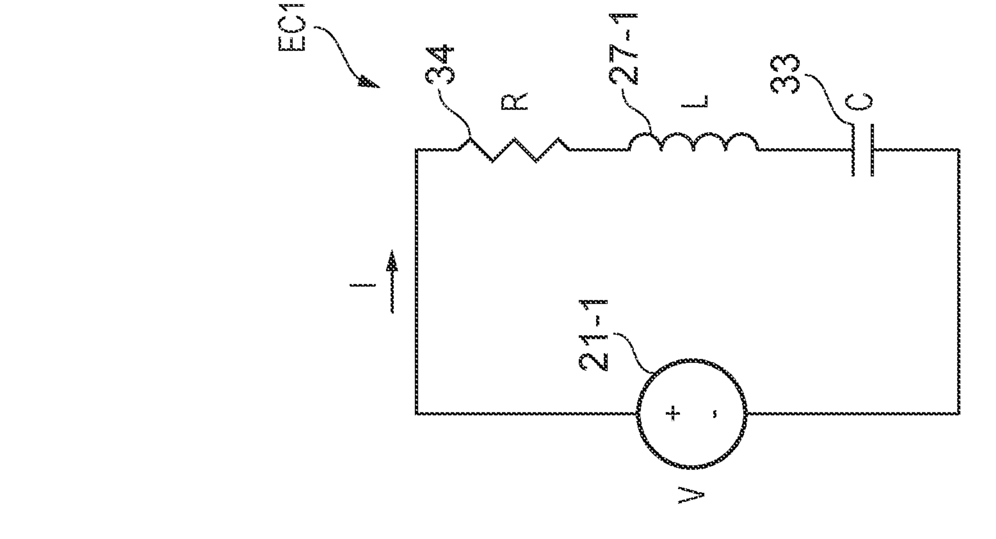
FIG. 3 shows a first circuit representing the connection of a first induction heating element to a first power module.

A schematic representation of a first circuit EC1 comprising the power module 21-*n* and the induction element 27-*n* is shown in FIG. 3. As outlined above, the power module 21-*n* is operable to output alternating current to the at least one induction heating device 22-*n*. The oscillating electric field in the induction element 27-*n* creates an oscillating magnetic field which penetrates the conduit 3 of the exhaust system 4. The conduit 3 is composed of an electrically conductive material and the changing magnetic field generates eddy currents therein. The eddy currents are effective in heating the conduit 3 at a rate determined by the resistance of the conduit 3. Although the first circuit EC1 has an inherent ability to store electric charge (i.e. a capacitance), a separate capacitor 33 is added to control electrical behaviour. The induction element 27-*n*, the capacitor 33 and a resistor 34 are arranged in series in the first circuit EC1. The resistor 34 may be a discrete component provided in the first circuit EC1. Alternatively, the resistor 34 may represent the resistance of the inductive load with eddy current developing losses which are the source of heating. A resonant inductive coupling is established when the supply frequency is at a resonant frequency $f_0$. The effective impedance of the first circuit EC1 is reduced (typically at a minimum value) and the current and power transfer is maximised. The resonant frequency $f_0$ may be determined by the following equation:

$$f_0 = \frac{\omega_0}{2\pi} = \frac{1}{2\pi\sqrt{LC}} \quad (1)$$

where: $f_0$ is the resonant frequency;

$\omega_0$ is the wavelength;

L is the inductance; and

C is the capacitance.

Figure 4:
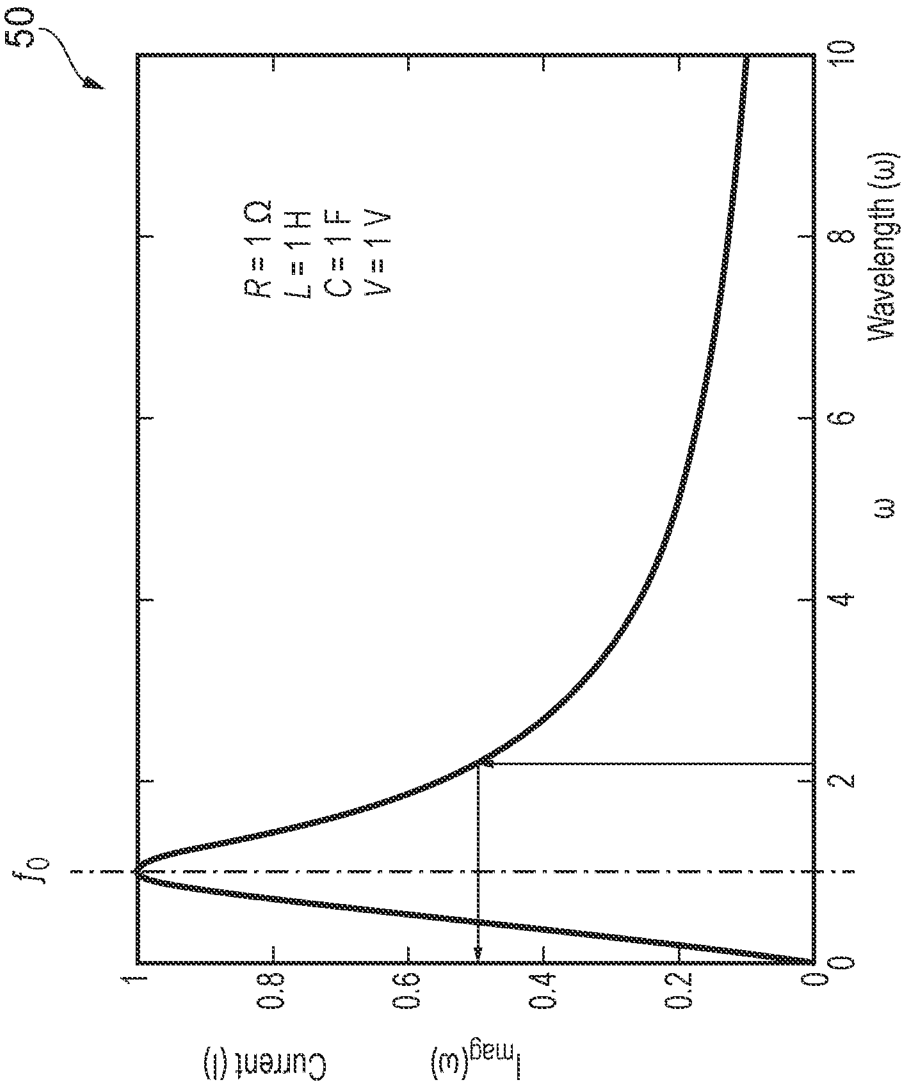
FIG. 4 is a first graph representing the current measured across the first induction heating element shown in FIG. 3 with respect to supply frequency.

The inductance (L) of the first circuit EC1 is a function of the material properties of the conduit 3, as well of the configuration of the coil formed by the induction element 27-*n*. A first graph 50 is shown in FIG. 4 representing the current (I) measured in the first circuit EC1 at a range of wavelengths output by the power module 21-*n*. For the purposes of this example, the resistance (R) is one (1) Ohm (Ω); the inductance (L) is one (1) Henry (H); the capacitance (C) is one (1) Farad (F); and the voltage is one (1) volt (V).

There are two control strategies available for controlling the power input into the conduit 3, namely: (a) selectively control the frequency of the alternating current supplied to the induction element 27-*n*; and (b) modulating the supply voltage (for example turning the supply voltage ON/OFF) while maintaining a fixed frequency of alternating current. The power module 21-*n* in the present embodiment is a variable frequency AC power module (21-*n*) and the preferred control strategy is to vary the supply frequency of the alternating current. The technique of controlling the frequency of the alternating current to control power transfer to the conduit 3 is illustrated by the arrows in the first graph 50. The controller 20 is configured to control the power module 21-*n* to adjust the frequency of the alternating current output to the induction element 27-*n*. The controller 20 can be configured to implement incremental changes (i.e. stepped changes) or substantially continuous changes in the supply frequency. By measuring the current (I) in the first circuit EC1, the controller 20 can identify the resonant frequency $f_0$. The resonant frequency $f_0$ is influenced by changes in the temperature of the base material, namely the conduit 3. By monitoring the resonant frequency $f_0$, the controller 20 can estimate a temperature of the conduit 3. Thus, the temperature of the conduit 3 can be determined without the need for a temperature sensor 32.

Figure 6:
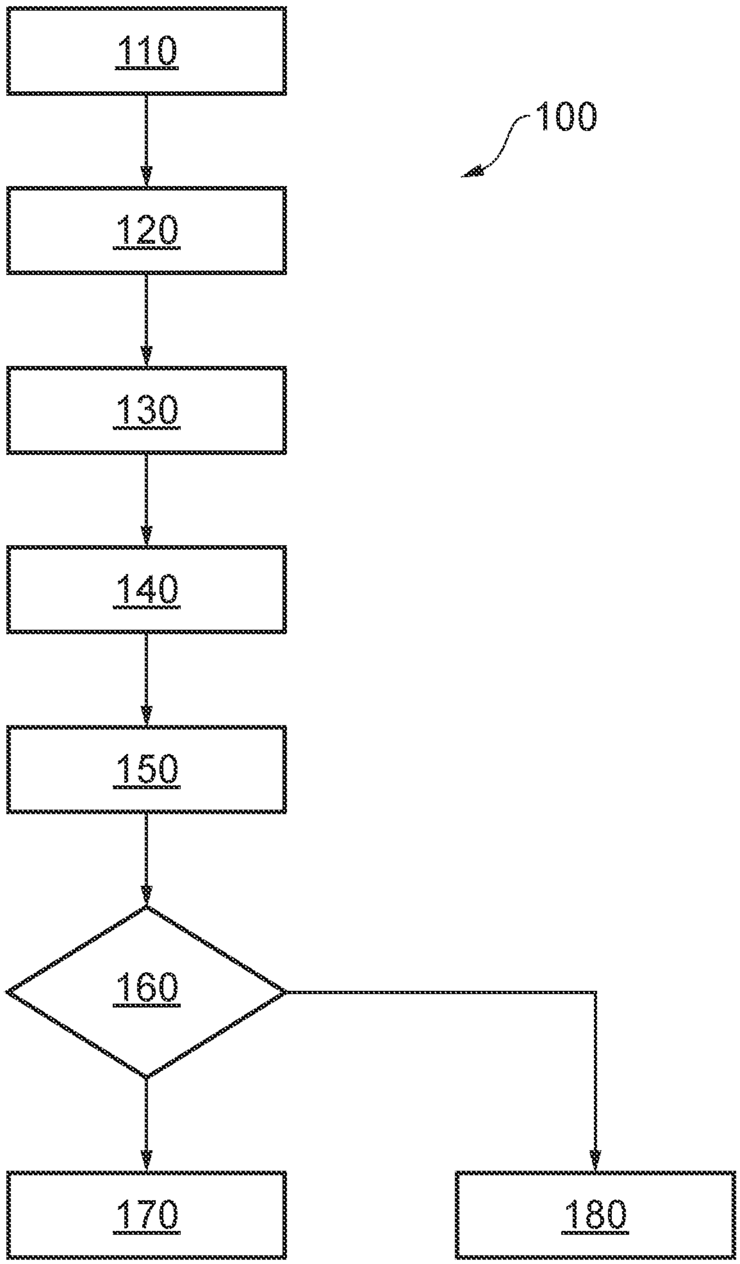
FIG. 6 is a flow diagram illustrating operation of the thermal management system shown in FIG. 5.

A flow diagram 100 representing operation of the TMS 2 is shown in FIG. 6. The alternating current is output from the power module 21-*n* to the to at least one induction element 27-*n* (BLOCK 110). The supply frequency of the alternating current output to the at least one induction element is varied, for example by scanning the supply frequency within a range (BLOCK 120). A current (I) across the at least one induction element 27-*n* is measured as a function of the supply frequency (BLOCK 130). At least one peak in the measured current is identified and the associated supply frequency is identified as the resonant frequency ($f_0$) (BLOCK 140). A temperature of the conduit 3 is determined (BLOCK 150). The temperature of the conduit 3 may be determined in dependence on the identified resonant frequency ($f_0$) or in dependence on a temperature signal received from the temperature sensor 32. The determined temperature of the conduit 3 is compared to a target temperature (BLOCK 160). The controller 20 controls the supply frequency of the alternating current in dependence on the determined temperature of the conduit 3. If the temperature of the conduit 3 is less than the target temperature, the controller 20 controls the supply frequency to reduce a frequency offset between the current supply frequency and the identified resonant frequency ($f_0$) (BLOCK 170). If the temperature of the conduit 3 is greater than the target temperature, the controller 20 controls the supply frequency to increase a frequency offset between the current supply frequency and the identified resonant frequency ($f_0$) (BLOCK 180). The process operates continuously while the industrial process is ongoing.

The operation of the TMS 2 will now be described in more detail. The controller 20 sets a target temperature for each of the temperature-controlled zones Z(n). The target temperature may be set according to operating or process characteristics, for example depending on a composition of exhaust gases to be transported within the conduit 3. The operation of an embodiment of the TMS 2 comprising a single induction heating device 22-1 will now be described with reference to FIG. 5. The first induction heating device 22-1 is disposed against the exterior of the conduit 3 and secured in position using the fasteners. The induction element 27-1 of the first induction heating device 22-1 extends at least substantially around the circumference of the conduit 3 to promote uniform heating. The first induction heating device 22-1 is connected to the output 26 of the first power module (21-*n*) 21-1. The controller 20 is connected to the first power module (21-*n*) 21-1 and outputs control signals CS1 to control the supply frequency of the alternating current output to the first induction heating device 22-1. The changing electric field in the induction element 27-1 creates an oscillating magnetic field which induces eddy currents which cause direct heating of the conduit 3. The temperature sensor 32 measures the temperature of the conduit 3 and outputs a temperature signal T(1) to the first power module (21-*n*) 21-1 and/or the controller 20. The controller 20 is configured to control the supply frequency of the alternating current in dependence on the measured temperature. If the temperature signal T(n) indicates a measured temperature below the target temperature, the controller 20 is configured to change the supply frequency (either by increasing or decreasing the supply frequency) to a frequency closer to the resonant frequency $f_0$ to increase the power transfer. A frequency offset between the current supply frequency and the identified resonant frequency $f_0$ is thereby reduced in order to increase heating of the component. If the temperature signal T(n) indicates a measured temperature above the target temperature, the controller 20 is configured to change the supply frequency (either by increasing or decreasing the supply frequency) such that it is further away from the resonant frequency $f_0$ to decrease the power transfer. A frequency offset between the current supply frequency and the identified resonant frequency $f_0$ is thereby increased in order to reduce heating of the component.

As outlined above, the resonant frequency $f_0$ varies in dependence on temperature. The relationship between the resonant frequency $f_0$ and the measured temperature of the conduit 3 may be predefined, for example in a look-up table stored in the system memory 24. The controller 20 may thereby determine the temperature of the conduit 3 in dependence on the determined resonant frequency $f_0$. Alternatively, or in addition, the controller 20 may be configured to control the power module 21-*n* to vary the supply frequency to determine the resonant frequency $f_0$. The supply frequency may be varied within a range, for example to perform a scan or sweep. The controller 20 may, for example, vary the supply frequency between a lower frequency limit and an upper frequency limit. The controller 20 in the present embodiment is configured to vary the supply frequency substantially continuously between the lower frequency limit and the upper frequency limit. In a variant, the controller 20 may be configured to implement incremental changes, for example comprising a plurality of step changes in the supply frequency. The controller 20 measures the current ($i_1$) across the first induction heating device 22-1 as the supply frequency changes. The controller 20 is configured to identify a peak in the measured current ($i_1$) as a function of the supply frequency. The peak may be identified by determining when the rate of change of the measured current is at least substantially equal to zero (0) as the supply frequency changes. The controller 20 identifies the resonant frequency $f_0$ as the frequency corresponding to the peak current. The controller 20 may selectively increase or decrease the supply frequency in dependence on whether the rate of change of the measured current is positive or negative in order to determine the resonant frequency $f_0$. Alternatively, the controller 20 may measure the current for a predefined range of supply frequencies. This process may be performed periodically, for example as a calibration operation.

Figure 7:
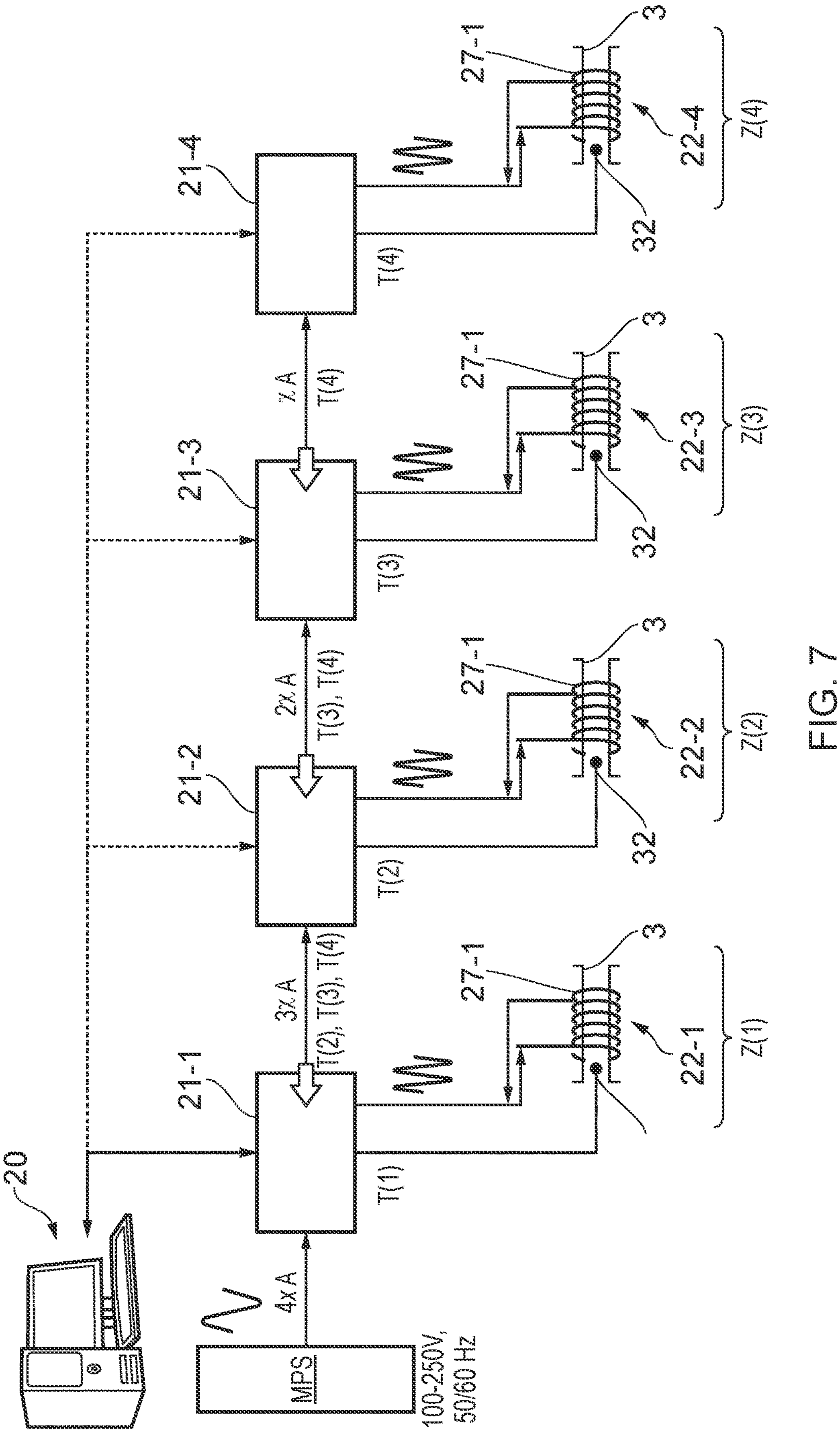
FIG. 7 is a schematic representation of a thermal management system comprising a plurality of induction heating elements having power modules connected in a daisy-chain arrangement.

A development of the TMS 2 is illustrated in FIG. 7. This implementation of the TMS 2 comprises a plurality of the induction heating devices 22-*n* each associated with a separate section of the conduit 3. The TMS 2 in this arrangement comprises a plurality of temperature-controlled zones Z(n) each comprising at least one induction heating device 22-*n*. In the illustrated arrangement, the TMS 2 comprises four (4) induction heating devices 22-1, 22-2, 22-3, 22-4 and four (4) associated power modules 21-1, 21-2, 21-3, 21-4. The induction heating devices 22-1, 22-2, 22-3, 22-4 are each connected to a respective one of the power modules 21-1, 21-2, 21-3, 21-4. The power modules 21-1, 21-2, 21-3, 21-4 are daisy-chained together and powered over a common line-voltage connection, thereby minimising the number of connections back to a central power distribution board. The power modules 21-1, 21-2, 21-3, 21-4 each receive a temperature signal T(n) from an associated temperature sensor 32. The controller 20 is configured to control the supply frequency of the alternating current output from each of the power modules 21-1, 21-2, 21-3, 21-4 in dependence on the temperature signal T(n). The supply frequency of the alternating current output to each induction heating device 22-1, 22-2, 22-3, 22-4 is controllable independently. Thus, the temperature of the separate temperature-controlled zones Z(n) can be controlled independently.

Figure 5:
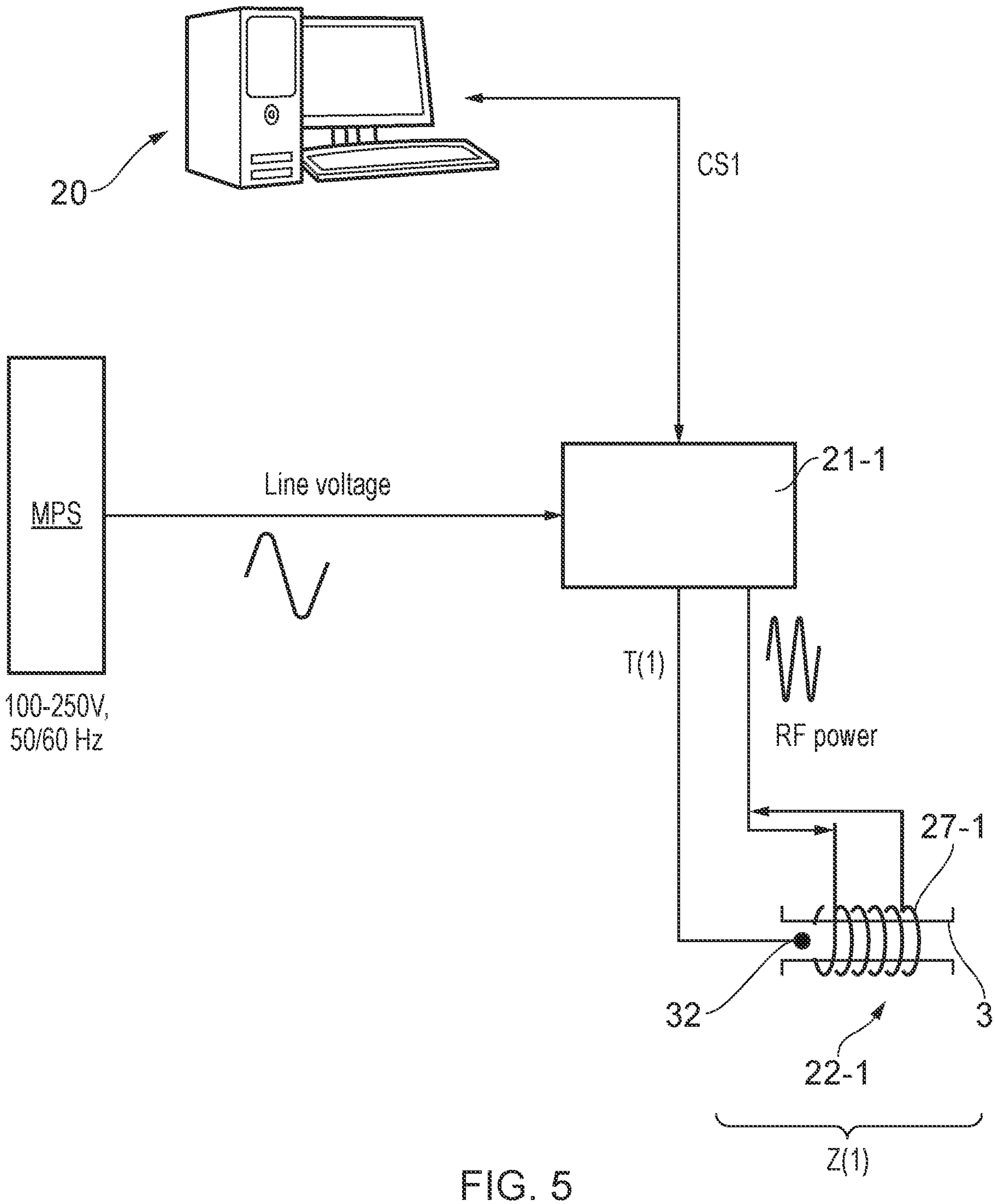
FIG. 5 is a schematic representation of a thermal management system comprising a single induction heating element connected to a power module.

The power modules 21-*n* may be configured to communicate directly with the controller 20 (as represented by the dashed lines shown in FIG. 5). In a variant, the power modules 21-*n* are configured to communicate with one another over the daisy-chained line-voltage connection. Each power module 21-*n* is configured to transmit and receive signals over the line-voltage connection. The first power module (21-*n*) 21-1 associated with the first induction heating device 22-1 may function as a master unit which communicates directly with the controller 20. The second, third and fourth power modules 21-2, 21-3, 21-4 associated with the subsequent induction heating devices 22-2, 22-3, 22-4 function as slave units. This connection offers the advantage of providing a single point of communication connection to the controller 20. In this arrangement the line-voltage connection is operative to transmit control signals CS1 to the respective power modules 21-*n* to control the supply frequency output to each induction heating devices 22-2, 22-3, 22-4. The temperature signal T(n) and other operating signals may optionally be transmitted over the line-voltage connection. The current across each induction heating devices 22-2, 22-3, 22-4 could optionally be measured and transmitted over the line-voltage connection. It will be understood that each power module 21-*n* is operable independently of the other power modules 21-*n*. The power requirement at the mains electrical connection is equal to the sum of the individual power requirements of each of the AC power module (21-*n*) units 21.

Figure 8:
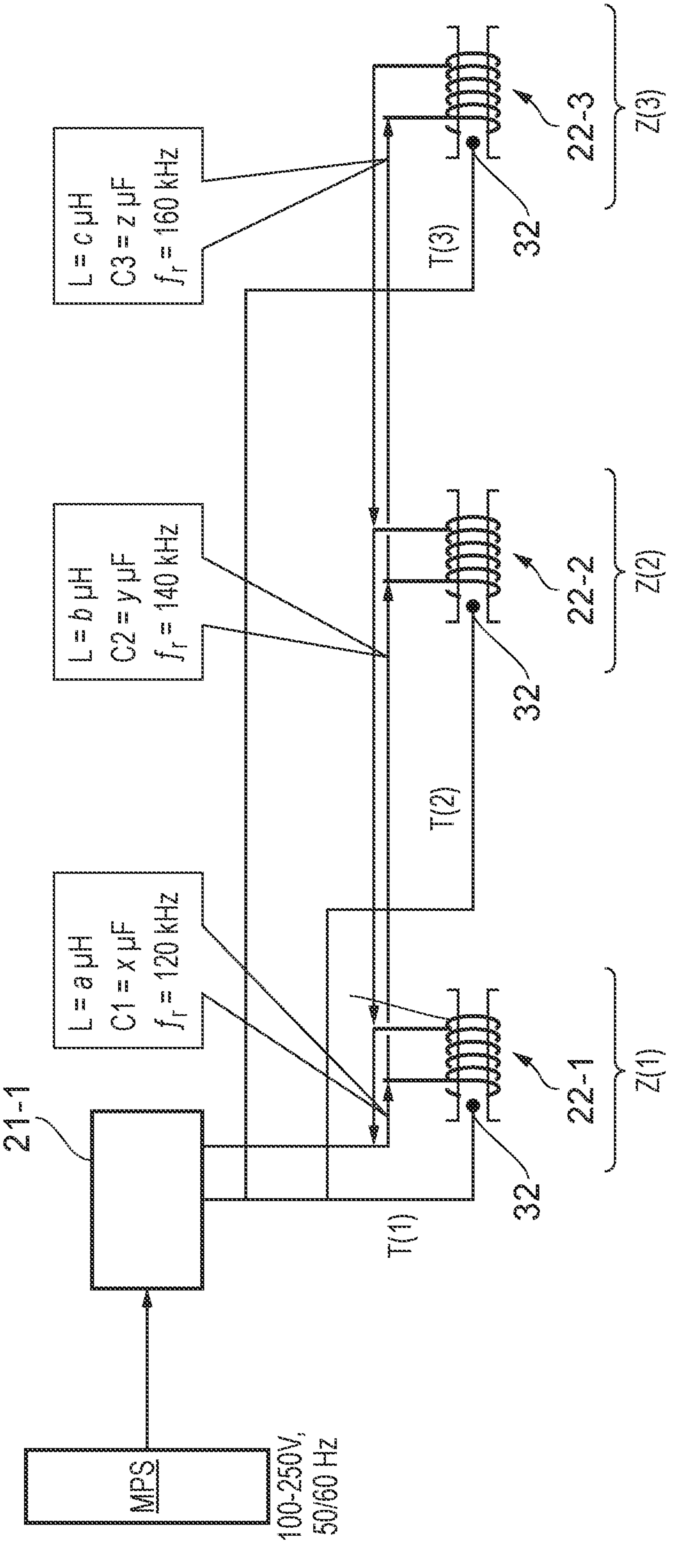
FIG. 8 is a schematic representation of a thermal management system comprising a plurality of induction heating elements connected in parallel to a common power module.

A further embodiment of the TMS 2 is illustrated in FIG. 8. Like reference numerals are used for like components. The TMS 2 comprises a plurality of temperature-controlled zones Z(n) each comprising at least one section of the conduit 3. The TMS 2 comprises a plurality of the induction heating devices 22-*n* each connected in parallel to a common power module 21-*n*. In the illustrated embodiment, there are three (3) of the induction heating devices 22-1, 22-2, 22-3 connected in parallel to the first power module (21-*n*) 21-1. The first, second and third induction heating devices 22-1, 22-2, 22-3 are each associated with a separate section of the conduit 3 (corresponding to separate temperature-controlled zones Z(n)). The temperature of the separate sections of the conduit 3 can be controlled independently.

Figure 9:
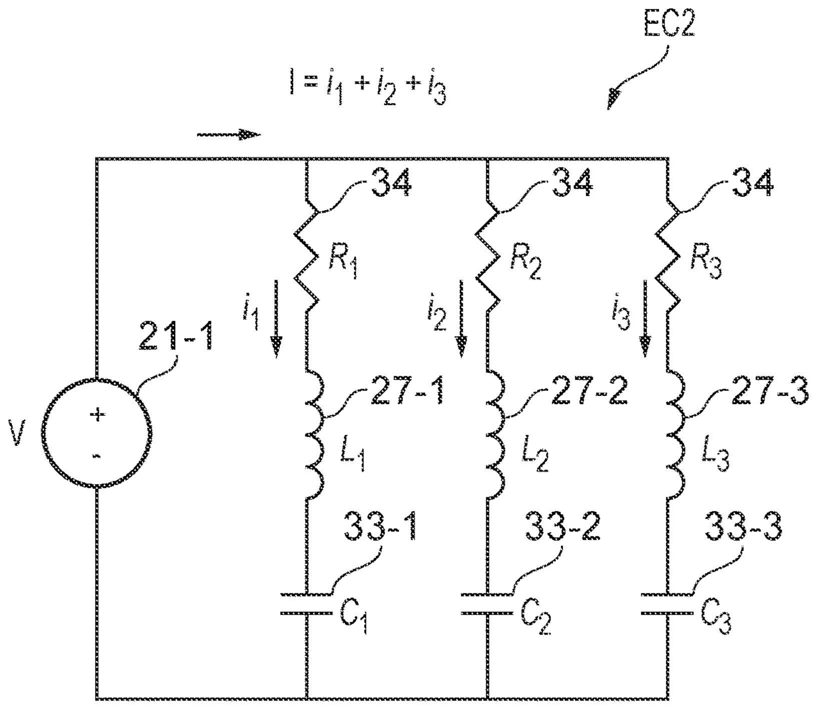
FIG. 9 shows a second circuit representing the parallel connection of the induction heating elements shown in FIG. 8.

A second circuit EC2 representing this embodiment of the TMS 2 is shown in FIG. 9. The second circuit EC2 comprises a plurality of branches connected in parallel to the AC supply module 21-1. The branches each correspond to one of the temperature-controlled zones Z(n). In the illustrated arrangement, the second circuit EC2 comprises three (3) branches, but it will be understood that the second circuit EC2 may comprise two (2) branches or more than three (3) branches. The second circuit EC2 comprises first, second and third capacitors 33-1, 33-2, 33-3 having respective first, second and third capacitances C1, C2, C3. The first, second and third capacitors 33-1, 33-2, 33-3 may each have capacitances C1, C2, C3 which are different from each other to alter the resonant frequency of each branch of the second circuit EC2. The current flow in each branch of the second circuit EC2 is dependent on the supply frequency of the current output by the first power module (21-*n*) 21-1. It will be understood that more than one induction heating device 22-*n* may be provided in each temperature-controlled zone Z(n), for example two or more induction heating devices 22-*n* may be connected in series within each branch of the second circuit EC2.

The controller 20 is configured to control the power module 21-*n* to vary the supply frequency to determine the resonant frequency $f_0$ of each branch of the second circuit EC2. The supply frequency may be varied within a range, for example between a lower frequency limit and an upper frequency limit. In the present embodiment, the controller 20 controls the power module 21-*n* such that the supply frequency varies substantially continuously. The current (I) in each branch of the second circuit EC2 is measured as the supply frequency is varied across the range. In the present embodiment, the controller 20 measures a first current ($i_1$), a second current ($i_2$) and a third current ($i_3$) across the first, second and third induction heating devices 22-1, 22-2, 22-3 respectively. The controller 20 is operative to identify peaks in each of the first current ($i_1$), the second current ($i_2$) and the third current ($i_3$) as a function of the supply frequency. The peak in each of the first current ($i_1$), the second current ($i_2$) and the third current ($i_3$) corresponds to a resonant frequency $f_0$ in each of the first, second and third induction heating devices 22-1, 22-2, 22-3. The controller 20 is configured to determine the temperature of each section of the conduit 3 in dependence on the resonant frequency $f_0$ for each branch of the second circuit EC2. The controller 20 can also control the temperature of each section of the conduit 3 by controlling the AC supply module 21-1 to adjust the supply frequency. Alternatively, or in addition, the temperature of each section of the conduit 3 may be varied by selectively adjusting the inductance and/or capacitance of each branch of the second circuit EC2.

The controller 20 is described as measuring the current (I) across each of the induction heating devices 22-1, 22-2, 22-3. The total current (I) is equal to the sum of the first current ($i_1$), the second current ($i_2$) and the third current ($i_3$) (i.e. $I=i_1+i_2+i_3$). The first current ($i_1$), the second current ($i_2$) and the third current ($i_3$) each comprise a vector described in the complex domain with a phase and a module. The total current (I) could be measured and the presence or absence of resonant frequencies $f_0$ determined by detecting one or more peaks in the total current (I) as a function of the supply frequency. The controller 20 may monitor the total current (I) and count the total number of peaks present in the total current (I) across the range of the supply frequency. The identification of each peak in the total current (I) is indicative of a resonant frequency $f_0$ of a separate temperature-controlled zone connected in parallel to the power module 21-*n*. By determining how many peaks are present across the supply frequency range, the controller 20 can determine how many (n) induction heating devices 22-*n* are connected. The controller 20 may determine that there are no induction heating devices 22-*n* connected (i.e. n=0); or that there are one or more induction heating devices 22-*n* connected (n>=1). The controller 20 may thereby discover how many temperature-controlled zones Z(n) are connected to the power module 21-*n*. The ability to determine how many induction heating devices 22-*n* are connected may enable implementation of an automated or semi-automated control system.

Figure 10:
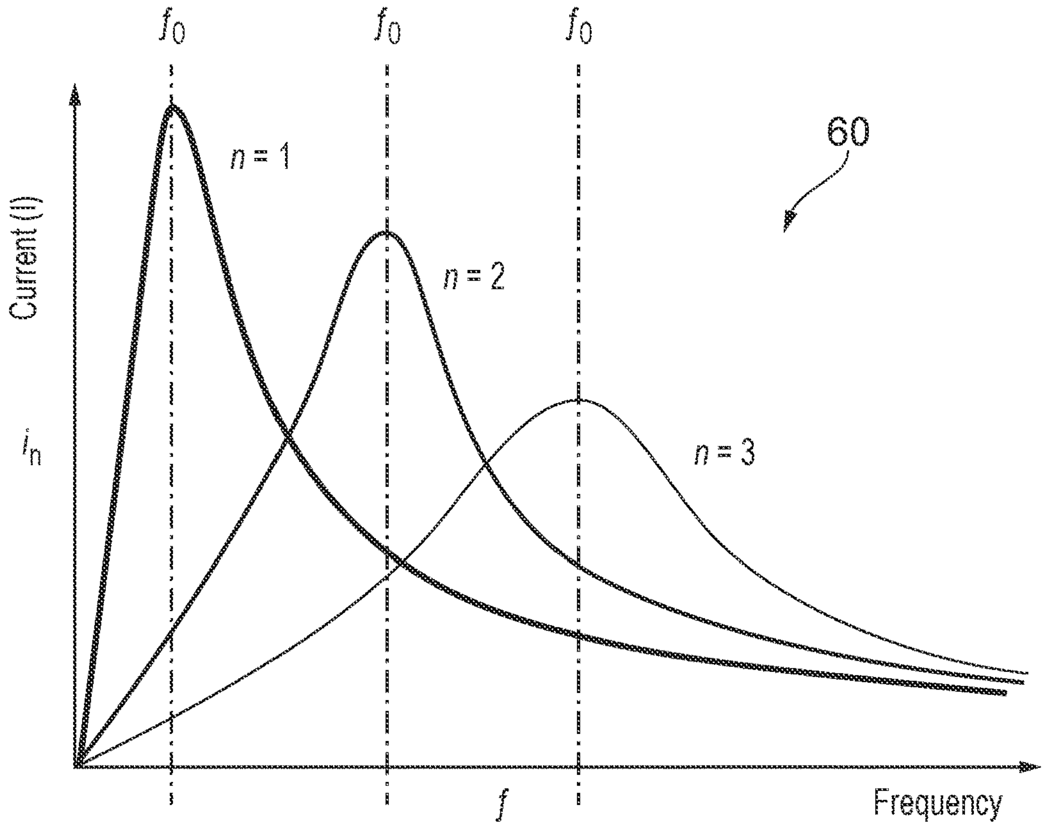
FIG. 10 is a second graph representing the current measured across each of the induction heating elements shown in FIG. 9.

A second graph 60 is shown in FIG. 10 representing the current (I) measured in the second circuit EC2 at a range of wavelengths output by the first power module (21-*n*) 21-1. The power module 21-*n* is a variable frequency AC power module (21-*n*) and the control strategy comprising controlling the supply frequency of the alternating current output to the induction elements 27-1, 27-2, 27-3. The controller 20 can be configured to implement incremental changes (i.e. stepped changes) or substantially continuous changes in the supply frequency. By measuring the first current ($i_1$), the second current ($i_2$) and the third current ($i_3$), the controller 20 can identify the resonant frequency $f_0$ of each induction element 27-1, 27-2, 27-3. The resonant frequency $f_0$ is influenced by changes in the temperature of the base material, namely the conduit 3. By monitoring the resonant frequency $f_0$, the controller 20 can estimate a temperature of each section of the conduit 3. The controller 20 is configured to control the first power module (21-*n*) 21-1 in dependence on the determined temperature of the corresponding sections of the conduit 3.

A variable capacitor and/or a variable inductor may be provided in each branch of the second circuit EC2. The controller 20 could be configured to control the capacitance and/or inductance in each branch to adjust the resonant frequency $f_0$ of each induction element 27-1, 27-2, 27-3.

The at least one induction heating device 22-*n* is described herein as a separate device which is located on the conduit 3. In a variant, the induction heating device 22-*n* could be integrated into the component 3. In particular, the induction element 27-*n* could be integrated into the conduit 3. The induction element 27-*n* could comprise a helix extending around the circumference of the conduit 3. Alternatively, the induction element 27-*n* could comprise a longitudinal coil of the type described herein extending at least partially around the circumference of the conduit 3. The induction element 27-*n* would be electrically and optionally also thermally insulated from the conduit 3. For example, an electrical insulating sheath may be provided around an exterior of the conduit 3. Each section 3-1, 3-2 of the conduit 3 may comprise electrical connectors. The electrical connectors may be used to connect the induction elements 27-*n* to each other (for example in parallel or series) and/or to the power module (s) 21-*n*. The conduit 3 may comprise coupling means for forming a fluid-tight seal with an adjacent conduit 3. A thermal insulating layer and/or an electrical insulating layer may be provided around the outside of the induction element 27-*n*.

It will be appreciated that various changes and modifications can be made to the present invention without departing from the scope of the present application.

The controller 20 has been described herein as determining the resonant frequency $f_0$ by measuring the current $i_1$ across the first induction heating device 22-1 as the supply frequency changes. The resonant frequency $f_0$ is identified as the supply frequency corresponding to a peak in the measured current ($i_1$). It will be understood that other techniques may be used to determine the resonant frequency $f_0$. For example, the resonant frequency $f_0$ may be determined by monitoring the phase of the voltage applied to the induction element 27-*n* and the current. At resonance, the phase is null since the circuit is purely resistive (corresponding to the maximum power transmitted). If the frequency is greater than the resonant frequency $f_0$ ($f>f_0$), the circuit behaves more like an inductance with a current 'behind' the voltage. If the frequency is less than the resonant frequency $f_0$ ($f<f_0$), the circuit behaves more like a capacitor with a current 'ahead' of the voltage. Thus, phase detection can be used to determine the resonant frequency $f_0$. The controller 20 may be configured to control the frequency of the alternating current supplied to the induction element 27-*n* in dependence on the determined phase.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An induction heating system for heating a component, the induction heating system comprising:
- a plurality of induction elements for positioning proximal to an exterior of the component;
- at least one power module for outputting an alternating current to the at least one induction element; and
- a controller configured to identify a plurality of resonant frequencies of the alternating current supplied to the plurality of induction elements;
- wherein the controller is configured to determine an operating temperature of the component in dependence on the identified resonant frequencies; and
- wherein the controller is configured to determine how many induction elements are connected in parallel to the power module in dependence on the number of identified resonant frequencies.

2. The induction heating system as claimed in claim 1, the controller being configured to:
- control the power module to change the supply frequency of the alternating current; and
- measure a current across the plurality of induction elements as a function of the supply frequency;
- wherein identifying the plurality of resonant frequencies comprises identifying the supply frequency of the alternating current corresponding to a plurality of peaks in the measured current.

3. The induction heating system as claimed in claim 1, wherein the controller is configured to:
- control the power module to change the supply frequency of the alternating current; and
- determine a phase difference between the voltage applied to the at least one induction element and the current in the induction element;
- wherein identifying the plurality of resonant frequencies comprises identifying the supply frequency which results in the phase difference being at least substantially zero.

4. The induction heating system as claimed in claim 1, wherein the controller is configured to control the power module to reduce a frequency offset between the supply frequency and the identified resonant frequency to increase or maintain heating of the component; and/or to increase a frequency offset between the supply frequency and the identified resonant frequency to reduce heating of the component.

5. The induction heating system as claimed in claim 1, wherein each induction element has a capacitor associated therewith, each capacitor having a different capacitance.

* * * * *